United States Patent
Heeren et al.

(10) Patent No.: US 6,181,091 B1
(45) Date of Patent: Jan. 30, 2001

(54) APPARATUS AND METHOD FOR CONTROL OF A MULTI-POLE BRUSHLESS DC MOTOR IN THE EVENT OF SATURATION DETECTION

(75) Inventors: Scott E. Heeren, San Jose; Bryan Scott Rowan, Los Gatos, both of CA (US)

(73) Assignee: International Business Machines Corporation, Armonk, NY (US)

( * ) Notice: Under 35 U.S.C. 154(b), the term of this patent shall be extended for 0 days.

(21) Appl. No.: 09/359,930

(22) Filed: Jul. 22, 1999

(51) Int. Cl.[7] ........................................................ H02P 7/00
(52) U.S. Cl. ........................ 318/138; 318/254; 318/439; 318/799
(58) Field of Search ................................... 318/254, 138, 318/439, 799

(56) References Cited

U.S. PATENT DOCUMENTS

| | | |
|---|---|---|
| 5,057,753 | 10/1991 | Leuthold et al. . |
| 5,319,289 | 6/1994 | Austin et al. . |
| 5,420,492 | 5/1995 | Sood et al. . |
| 5,457,375 | 10/1995 | Marcinkiewicz et al. . |
| 5,530,326 * | 6/1996 | Galving et al. ........................ 318/254 |
| 5,739,652 | 4/1998 | Sriram . |
| 5,886,489 | 3/1999 | Rowan et al. . |
| 5,963,007 * | 10/1999 | Toyozawa et al. .................. 318/799 |

* cited by examiner

Primary Examiner—Robert E. Nappi
Assistant Examiner—Rita Leykin
(74) Attorney, Agent, or Firm—Ohlandt, Greeley, Ruggiero & Perle, L.L.P.

(57) ABSTRACT

A system for controlling a brushless dc motor includes a motor driver circuit that outputs a drive current to the motor and a power supply that provides power to the motor driver circuit. Feedback circuits provide signals indicative of: a speed of rotation of the motor and at least one of: a level of the supply voltage provided by the power supply, and the output current from the motor driver circuit. A processor analyzes the feedback signals and determines if a required change in drive current to the motor will result in a saturation or near saturation condition. If such a saturation or near saturation condition is anticipated, the processor initially determines if a change in commutation angle will avoid the saturation or near saturation condition and if yes, outputs a control signal to alter the commutation angle. If the processor determines that a change in commutation angle will not avoid the saturation or near saturation condition, wave shaping actions within the motor driver circuit are disabled so as to maintain synchronism between the motor and the frequency of the output drive current from the motor driver, at a cost of increased acoustic noise from the motor.

10 Claims, 2 Drawing Sheets

APPARATUS AND METHOD FOR CONTROL OF A MULTI-POLE BRUSHLESS DC MOTOR IN THE EVENT OF SATURATION DETECTION

FIELD OF THE INVENTION

This invention relates generally to control of multi-pole brushless dc motors and, more particularly, to a method and apparatus for control of such motors when used with disk drives in the event of an anticipated saturation event.

BACKGROUND OF THE INVENTION

The use of multi-phase brushless dc motors to power computer disk drives is well known. In such drives, a plurality of stator coil elements are uniformly arranged on a stationary substrate. A rotor assembly, having a plurality of permanent magnets, rotates about the stator coils. The coils are periodically energized in order to induce rotational movement of the rotor assembly.

Unlike conventional brush motors having mechanical brushes to commutate the stator coils, brushless or commutator-free motors used in disk drives are electronically commutated through analysis of coil waveforms, or based upon outputs from magnetic or optical sensors.

Brushless motors tend to generate unwanted noise and vibration as a result of excessive spindle power consumption. Further, while conventional dc motors have commutator bars that provide a relatively smooth torque output curve, brushless motors have relatively few phases driving the rotor. The relatively long duration of passage of the rotor over each stator coil results in significant torque ripple that, in turn, causes acoustic noise and vibration.

The prior art includes a number of teachings regarding methods for control of acoustic noise in a disk drive, under normal operating conditions. For example, U.S. Pat. No. 5,886,489 to Rowan et al., assigned to the same assignee as this application, discloses a method for reducing spindle power and acoustic noise in a brushless dc motor for a disk drive. The Rowan et al. system adjusts the commutation angle of the motor until a point of optimum power consumption is reached. Varying the commutation angle in opposite directions enables a point of minimum spindle power consumption to be determined, and enables a reduction in the spindle power and acoustic noise.

U.S. Pat. No. 5,319,289 to Austin et al. describes a circuit for providing an adaptive commutation delay in a brushless dc motor. The circuit adjusts the commutation delay as a function of the rotor's rotational speed so as to maximize motor torque and minimize power consumption. A variety of further teachings regarding commutation control of dc motors may be found in the following patents: U.S. Pat. Nos. 5,420,492 to Sood et al.; 5,457,375 to Marcinkiewicz et al.; 5,057,753 to Leuthold et al.; 5,530,326 to Galvin, et al.; and 5,739,652 to Sriram. None of the aforesaid prior art teachings consider conditions which occur when motor saturation is approached during speed control of a dc brushless motor.

Motor saturation occurs when the supply voltage to the motor driver, less the driver output voltage drop, equals the back emf generated by the motor plus the IR drop through the windings of the motor. Under such circumstances, an increased output of motor driver current is no longer possible. In such a case, even if a command is received to output a higher drive current, that command has little or no effect on the motor speed. This is due to the fact that the drive voltage available is insufficient to generate the required current and, in turn, the torque needed to increase the motor speed. Note that the condition which causes a problem for the waveform shaping circuitry is not merely one of absolute motor saturation, i.e., when the level of current being applied to the motor windings is at an absolute maximum. In fact, the problem normally occurs when the motor is "nearly" saturated, i.e., when the current level can be increased slightly, but not fast enough to reach the target, or command, value prior to the time when the motor should be commutated. In such a circumstance, for a waveform shaping motor driver that relies on reaching a target current prior to the next commutation, the motor driver loses its ability to commutate properly, as long as the waveform shaping mode is enabled. Consequently, the commutation action becomes distorted or disturbed. Eventually, the motor loses synchronization with the output frequency of the motor driver and disk drive failure occurs.

Accordingly, it is an object of this invention to provide a system and apparatus for control of a brushless dc motor used to safely operate a disk drive, when a saturation condition is approached.

It is another object of this invention to provide a method and apparatus for control of a disk drive motor which prevents loss of synchronization, when a saturation condition is approached.

SUMMARY OF THE INVENTION

A system for controlling a brushless dc motor includes a motor driver circuit that outputs a drive current to the motor and a power supply that provides power to the motor driver circuit. Feedback circuits provide signals indicative of: a speed of rotation of the motor and at least one of: a level of the supply voltage provided by the power supply, and the output current from the motor driver circuit. A processor analyzes the feedback signals and determines if a required change in drive current to the motor will result in a saturation or near saturation condition. If such a saturation condition is anticipated, the processor initially determines if a change in commutation angle will avoid the saturation condition and if yes, outputs a control signal to alter the commutation angle. If the processor determines that a change in commutation angle will not avoid the saturation condition, wave shaping actions within the motor driver circuit are disabled so as to maintain synchronism between the motor and the frequency of the output drive current from the motor driver, at a cost of increased acoustic noise from the motor.

DETAILED DESCRIPTION OF THE INVENTION

Figure 1:
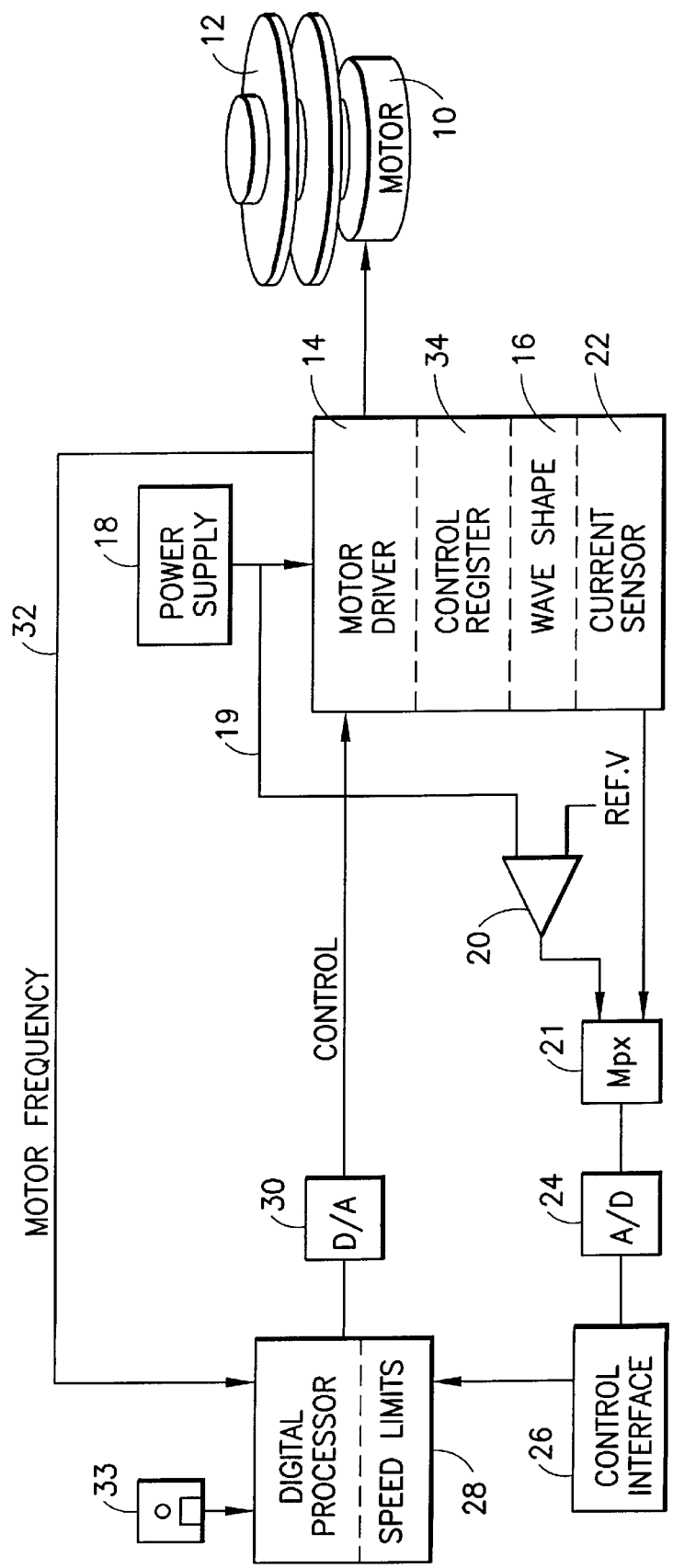
FIG. 1 is a block diagram of a motor control system embodying the invention.

Referring to FIG. 1, a brushless dc motor 10 drives one or more disks 12 in the known manner. Motor 10 receives its energization from a motor driver circuit 14 that incorporates a waveshaping capability 16. Power supply 18 provides a supply voltage for motor driver circuit 14. The supply voltage is also applied, via line 19, through a differential amplifier 20 to a multiplex switch 21. A further input to multiplex switch 21 is received from current sensor 22 which senses the level of the current fed from motor driver circuit 14 to motor 10. Multiplex switch 21 feeds the supply voltage and current value that is output by current sensor 22 through an analog to digital (A/D) converter 24. Those values are then fed to a control interface 26 and then back to a digital processor 28.

Digital processor 28 outputs digital control signals, that are converted to analog control signals by digital to analog converter 30. Those analog control signals are applied to motor driver circuit 14. A further input to digital processor 28 is received from motor driver 14, via line 32, which carries signals indicative of the rotational frequency of motor 10.

It is to be understood that while the code for the control method employed by digital processor 28 is assumed to already be resident in memory within the processor, that such code may be resident on a memory device 33, the contents of which can be loaded into the processor on as-needed basis.

As indicated above, motor saturation results when the supply voltage fed by power supply 18 to motor driver circuit 14 less the IR drop resulting from the current flowing through the driver circuit is equal to the back emf generated by motor 10 plus the IR drop seen across the windings of motor 10. Under such conditions, a command from digital processor 28 to increase the output current from motor driver circuit 14 will not result in a corresponding actual motor current increase nor the desired increase in the speed of motor 10. As is also indicated above, the condition of concern is not only that of absolute saturation, but also any condition sufficiently close to absolute saturation such that the time required for the motor current to rise to the target value exceeds the time prior to the next commutation point.

It should be understood that the term "saturation" where it appears in the remainder of this text refers not only to absolute saturation, but also to "any condition sufficiently close to saturation" as described here. Such conditions pose a problem to the waveform shaping circuits 16 because these circuits require the current through motor 10 to reach the target value commanded by processor 28 before they will generate the next motor commutation. In the event that the motor current does not rise up to the command value in time, the circuit will not generate a motor commutation at the proper time, resulting in a loss of synchronization between the motor and the motor driver circuit. Such action results in an increase in acoustic noise and may, more importantly, cause erratic motor speed errors, resulting in a failure of the disk drive system.

To avoid this result, the invention monitors the supply voltage of power supply 18 and/or the output current from motor driver circuit 14, as well as the motor frequency. Those monitored values are used to determine if a required current adjustment will result in motor saturation. If such is determined to be the case, digital processor 28 first determines whether motor saturation can be avoided by a change in commutation angle (e.g., an advance of the commutation angle). Such a change in commutation angle moves the commutation points away from the points that are ideal for power efficiency, reducing the effective motor constant and allowing a higher potential motor current. The latter occurs because the driving interval now coincides with an interval in time where the motor-generated back emf has a smaller magnitude. The higher potential current yields a higher potential torque.

However, a change in commutation angle generally results in a small potential torque increase and may not provide a sufficient increase thereof to overcome the saturation problem. In such case, digital processor 28 disables waveshape circuit 16 to avoid distortion or disturbance of the drive current waveform. This action enables a continuation of synchronism between motor 10 and the motor drive current. However, the disabling of waveshaping circuit 16 causes an increase in acoustic noise. Nevertheless, motor 10 remains in synchronism with the drive current and operation of the disk drive system can continue.

Figure 2:
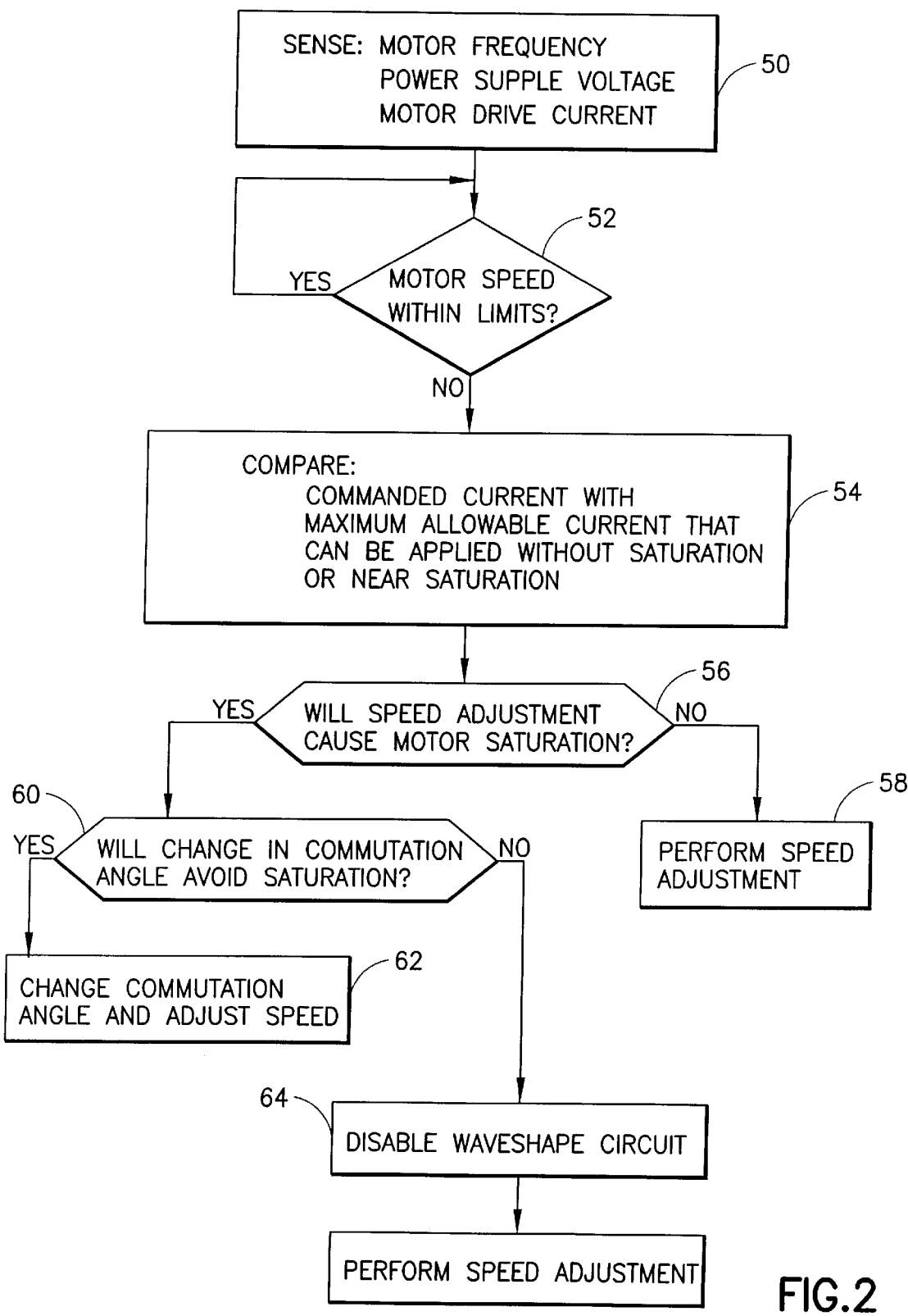
FIG. 2 is a high level logic flow diagram illustrating the method of the invention.

Turning now to FIG. 2, further details of the control method performed by digital processor 28 will be described. As indicated above, digital processor 28 receives signals that are indicative of the rotational speed of motor 10, and the output voltage from power supply 18 and/or the motor current fed from motor driver circuit 14 (step 50).

Processor 28 compares the motor speed to pre-stored motor speed limits to determine if the motor speed is within the limits. The motor speed limits define a desired range of speeds within which motor 10 is to be maintained. If the motor speed is within the limits, the procedure recycles. If the motor speed is not within the limits, requiring a control action, the procedure moves to step 54 where it is determined whether the required control action may result in saturation of motor 10 by a comparison of the commanded drive current with the maximum allowable current that can be applied without resulting in saturation or near saturation of motor 10.

The operation carried out by digital processor 28 to predict motor saturation can be determined from the following relations. In theory, a reliable prediction of the motor saturation condition involves a number of steps. First, take equation 1 below, which describes the relationship between supply voltage and motor current:

$$V\text{supply}=Kt^*w+Im(Rd+Rm)^*Vhr \qquad (1)$$

In equation 1, Vsupply is the voltage (in volts) of the power supply feeding the motor driver circuit, Kt is the motor's torque constant (in Newton meters per Amp), w is the angular velocity (in radians per second) of the motor, Im is the current flowing through the motor, Rm is the resistance (in Ohms) of the motor (from phase to phase), Rd is the resistance (in Ohms) of the motor driver circuit, and Vhr is the "voltage headroom." The voltage headroom at any point in time is the difference in voltage between the voltage provided by the power supply and the voltage required to generate the motor current at the same point in time. So the level of voltage headroom, in effect, determines how much more current could be provided to the motor than what is already being drawn. By definition, the motor reaches the condition of "absolute saturation" when the voltage headroom is equal to zero. Therefore, to determine the approximate motor current level at which "absolute saturation" would ensue, one could set Vhr equal to zero and solve for Im, or motor current, in equation 1 above.

However, as described previously, "absolute saturation" is not the only condition to be avoided. We also must avoid any condition sufficiently close to absolute saturation such that the time required for the motor current to rise to the target value exceeds the time prior to the next commutation point. In order to predict such conditions accurately, we must take into account the time constant of the motor and the characteristic shape of the back-emf waveform, in addition to the factors expressed in equation 1.

Taking these additional factors into account, equation 2 expresses motor current, Im, as a function of time, given a fixed motor time constant Lm/Rm, a fixed supply voltage Vsupply, and a constant back-emf voltage Vbemf:

$$Im(t)=(Vsupply-Vbemf)/Rm*(1-\exp(-Rm/Lm*t)) \qquad (2)$$

In equation 2, Lm/Rm, or 1/(Rm/Lm), is the time constant of the motor, where Lm is the motor inductance (in Henrys) and Rm is the phase to phase motor resistance (in Ohms).

Manipulating this equation, we can solve for the time required for the motor current to rise from zero to a target value:

$$Ttarget=Lm/Rm* Ln(E/(E-Rm*Itarget)) \qquad (3)$$

In equation 3, Ttarget represents the time (in seconds) required for the current to rise from zero to the target current value, Itarget. In addition, notice that the quantity Vsupply−Vbemf has been replaced by E for convenience.

In reality, the back-emf voltage of the motor is not constant. Rather, it has a near sinusoidal waveform. There is one back-emf waveform for each phase of the motor, so for a three phase motor, there exist three near-sinusoidal back-emf waveforms, all 120 degrees out of phase with one another. The portion of the back-emf waveform we are concerned with in these calculations (assuming the motor is being driven symmetrically for maximum power efficiency) is the crest of the waveform, from approximately 60 degrees before the peak to the peak. This portion coincides with the interval in time from one commutation point to the next. In order to maintain sufficient accuracy in the calculation of equation 3, the back-emf voltage can be averaged over the interval of concern. Alternatively (and more accurately), the calculation can be iterated over smaller time intervals (using the appropriate back-emf voltage for each calculation), and then the resultant time values for each calculation can be added to determine the predicted time for the motor current to rise from to the commanded level.

The result (Ttarget) of equation 3, or a derivation thereof, can then be compared with the commutation period. If Ttarget exceeds the commutation period, then we know that the commanded current value will likely result in the undesired saturation condition.

Equation 3 is rather complicated, and not suitable for implementation in a digital processor. What is preferable is a linear relationship between supply voltage and maximum current, where maximum current is the highest command current allowable before the onset of saturation. This relation can be found by plugging the commutation period for time t into equation 2, and solving for Im over a range of Vsupply. Again, recall that the Vbemf value is not constant. Therefore, in order to maintain sufficient accuracy, the calculation can be iterated over several smaller time intervals, using an appropriate value for Vbemf for each iteration. For example, if the commutation interval, Tcomm, is divided into N equal segments of time, the maximum current, Imax, for a given supply voltage, Vsupply, could be found from N iterations, as shown in equation 4.

$$Imax=\text{Summation from } i=1 \text{ to } N \text{ of } \{[(Vsupply-Vbemf(i))/Rm - \ldots \\ . Im(i-1)]*[1-\exp(-Rm/Lm*(Tcomm/N))]\} \qquad (4)$$

where Im(0)=0 and Vbemf(i) is the corresponding back-emf value for each point in time. Of course, the accuracy of the result will improve as N increases. If the above operation is repeated over a range of supply voltage values that represent the expected range of operation, then a relationship can be found between the voltage of the power supply and the maximum allowable current. Next, this relation can be approximated with a "best fit" linear equation suitable for processor implementation. This equation will be of the form of equation 5 below, $$Imax=Vsupply*V\_to\_I\_factor+offset \qquad (5)$$

where the V_to_I_factor term is the slope of the equation, and the offset term accounts for the y-intercept of the equation in addition to some protection margin.

If the commanded speed adjustment will not result in saturation of motor 10, digital processor 28 performs the speed adjustment (decision step 56) by outputting a command to motor driver circuit 14 to increase the output current to motor 10 (step 58). By contrast, if the speed adjustment will result in motor saturation, the procedure moves to decision step 60 to determine if an advance in commutation will avoid the saturation condition.

The means used by processor 28 to determine whether or not a shift in the commutation angle will avoid motor saturation is derived from equation 4 above. Advancing the commutation angle such that the motor commutation points are no longer exactly symmetric with respect to the crest of the back-emf waveform serves to effectively reduce the value of the Vbemf term for each iteration. In turn, the rise time of the current in the motor is decreased. This means the value of Imax in equation 5 is greater for the same value of Vsupply. The advantage of a phase advance can be calculated over a range of approximately 20 electrical degrees and over the operating power supply voltage range. (The value of 20 degrees is chosen because the motor driver used in this invention allows a maximum advance of 20 degrees.) Each phase shift value translates into a corresponding reduction in the Vbemf term in equation 4, which yields a higher Imax value. The difference between Imax with phase shift and Imax without phase shift (both resulting from equation 4) is then a function of phase shift only. This relationship can also be approximated with a linear equation where the delta in Imax, Imax_delta, is a function of phase, or angle advance. This equation can then be inverted to yield an equation in which angle advance is a function of the needed increase in the maximum allowable current necessary to prevent saturation. This equation is shown as equation 6 below, and is ready for processor implementation:

$$Angle\_advance=(Icommand-Imax)*I\_to\_angle\_factor \qquad (6)$$

The Angle_advance term indicates the value by which the commutation angle would need to be advanced in order to avoid saturation. Processor 28 then compares this result with the maximum available advance. As long as the Angle_advance value is less than or equal to the maximum advance angle available, the processor will adjust the commutation angle to the Angle_advance value by sending a control signal to the motor driver control register 34 (step 62). Processor 28 will then proceed to command the calculated current output by sending a signal (via D/A converter 30) to motor driver circuit 14. If the Angle_advance value exceeds the maximum advance angle available, so that the maximum available commutation angle advance will not avoid saturation, 15 the procedure moves to step 64. There waveshaping circuit 16 is disabled. This action reduces distortion or disturbance of the motor drive current that would otherwise occur as a result of an increased drive. Accordingly, synchronism between motor 10 and motor driver circuit 14 continues.

The aforesaid procedure may result in an increase in acoustic noise due to the loss of waveshaping of the output current; however, synchronism is maintained and continued operation of the disk drive system achieved.

Admittedly, equations 1 to 4, referred to as the basis for the processor-implemented equations 5 and 6 will not perfectly describe the mechanics and electronics of the system. Therefore, it is advantageous to characterize the relationships between the voltage of power supply 18, the current through motor 10, the commutation angle and the likelihood of saturation with experimental data. This can be done on a sample of disk drives over the entire expected operating ranges of supply voltage and commutation angle. For each combination of supply voltage and commutation angle, the motor current command can be incremented gradually until the saturation condition is reached. This should be done in a fashion whereby the forced current only departs from the closed-loop speed control current command for short durations so as not to cause the motor to depart from the desired operating speed. With data collected in this manner, the processor-implemented equations 5 and 6 can be determined.

Note that this invention can be implemented with feedback signals for either or both of the power supply voltage and the motor current. The advantage of motor current feedback is that the rise time of the motor current, and thus the likelihood of saturation, can be monitored directly, rather than predicted by calculation.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. A system for controlling a brushless dc motor, said system comprising:

a motor driver for outputting a drive current to said motor;

a power supply connected to said motor driver for providing a supply voltage thereto;

feedback circuits for providing feedback signals regarding a speed of rotation of said motor, and at least one of: said supply voltage level and a level of said drive current;

a processor for analyzing said feedback signals and for determining if a required change in drive current to said motor will result in a saturation or near saturation condition, and, if yes, determining if a change in commutation angle of said drive current to said motor will avoid said saturation or near saturation condition and, if yes, outputting a control signal to said motor driver to change said commutation angle of said drive signal; and if said processor determines that a change in commutation of said drive current will not avoid said saturation or near saturation condition, said processor disables a waveshaping action applied by said motor driver to said drive current.

2. The system as recited in claim 1, wherein said processor causes said motor driver to alter said commutation angle by an advance thereof.

3. The system as recited in claim 1, wherein said processor determines if said motor will be saturated or nearly saturated by a comparison of a commanded drive current with a maximum allowable current that can be applied without resulting in saturation or near saturation of said motor, and if the commanded current will result in saturation or near saturation, outputting said control signal.

4. The system as recited in claim 1, wherein said motor is coupled to one or more memory disks and serves as a drive member therefor.

5. A memory media for operating a control system to control a brushless dc motor, said system comprising a motor driver for outputting a drive current to said motor, a power supply connected to said motor driver for providing a supply voltage thereto, feedback circuits for providing feedback signals regarding a speed of rotation of said motor and at least one of: a level of said supply voltage and a level of said drive current, and a processor, said memory media comprising:

a) means for controlling said processor to analyze said feedback signals to determine if a required change in drive current to said motor will result in a saturation or near saturation condition;

b) means responsive to a determination that the required change in drive current to said motor will result in a saturation or near saturation condition, for controlling said processor to determine if a change in commutation angle of said drive current to said motor will avoid said saturation or near saturation condition and, if yes, for outputting a control signal to said motor driver to change said commutation angle of said drive signal; and c) means responsive to a determination that a change in commutation of said drive current will not avoid said saturation or near saturation condition, for disabling a waveshaping action applied by said motor driver to said drive current.

6. The memory media as recited in claim 5, wherein means b) controls said processor to cause said motor driver to alter said commutation angle of said drive current by an advance function.

7. The memory media as recited in claim 5, wherein means a) controls said processor to determine if said motor will be saturated or nearly saturated by comparison of a commanded drive current with a maximum allowable current that can be applied without resulting in saturation or near saturation of said motor, and if the commanded current will result in saturation or near saturation, causing means b) to determine if said change in said commutation angle of said drive current will avoid said saturation or near saturation condition.

8. A method for operating a control system to control a brushless dc motor, said system comprising a motor driver for outputting a drive current to said motor, a power supply connected to said motor driver for providing a supply voltage thereto, feedback circuits for providing feedback signals regarding a speed of rotation of said motor and at least one of: a level of said supply voltage and a level of said drive current, and a processor, said method comprising the steps of:

a) analyzing said feedback signals to determine if a required change in drive current to said motor will result in a saturation or near saturation condition;

b) if the required change in drive current to said motor will result in a saturation or near saturation condition, determining if a change in commutation angle of said drive current to said motor will avoid said saturation or near saturation condition and, if yes, outputting a control signal to said motor driver to change said commutation angle of said drive signal; and c) if a change in commutation angle of said drive current will not avoid said saturation or near saturation condition, disabling a waveshaping action applied by said motor driver to said drive current.

9. The method as recited in claim 8, wherein step b) causes said motor driver to alter said commutation angle by an advance function.

10. The method as recited in claim 8, wherein step a) determines if said motor will be saturated or nearly saturated by comparing a commanded drive current with a maximum allowable current that can be applied without resulting in saturation or near saturation of said motor, and if the commanded current will result in saturation or near saturation, causing step b) to determine if said change in commutation angle of said drive current to said motor will avoid said saturation or near saturation condition.

* * * * *